US011854305B2

United States Patent
Wu et al.

(10) Patent No.: US 11,854,305 B2
(45) Date of Patent: Dec. 26, 2023

(54) SKELETON-BASED ACTION RECOGNITION USING BI-DIRECTIONAL SPATIAL-TEMPORAL TRANSFORMER

(71) Applicant: International Business Machines Corporation, Armonk, NY (US)

(72) Inventors: Bo Wu, Cambridge, MA (US); Chuang Gan, Cambridge, MA (US); Dakuo Wang, Cambridge, MA (US); Kaizhi Qian, Champaign, IL (US)

(73) Assignee: International Business Machines Corporation, Armonk, NY (US)

( * ) Notice: Subject to any disclaimer, the term of this patent is extended or adjusted under 35 U.S.C. 154(b) by 234 days.

(21) Appl. No.: 17/315,319

(22) Filed: May 9, 2021

(65) Prior Publication Data
US 2022/0374629 A1 Nov. 24, 2022

(51) Int. Cl.
*G06V 40/20* (2022.01)
*G06T 7/246* (2017.01)
(Continued)

(52) U.S. Cl.
CPC .............. *G06V 40/23* (2022.01); *G06F 3/011* (2013.01); *G06F 18/2133* (2023.01);
(Continued)

(58) Field of Classification Search
None
See application file for complete search history.

(56) References Cited

U.S. PATENT DOCUMENTS

| 2016/0104298 A1 | 4/2016 | Nam |
| 2019/0094981 A1* | 3/2019 | Bradski ................ H04N 21/414 |

(Continued)

FOREIGN PATENT DOCUMENTS

| CN | 104615983 A | 5/2015 |
| CN | 105787439 | 7/2016 |

(Continued)

OTHER PUBLICATIONS

PRC National IP Admin as ISA, Authorized Office Ning Wang PCT International Search Report and Written Opinion, 9 pages total, Jun. 29, 2022, Counterpart PCT App. PCT/CN2022/084747.

(Continued)

*Primary Examiner* — Delomia L Gilliard
(74) *Attorney, Agent, or Firm* — Daniel Morris; Otterstedt & Kammer PLLC

(57) ABSTRACT

A bi-directional spatial-temporal transformer neural network (BDSTT) is trained to predict original coordinates of a skeletal joint in a specific frame through relative relationships of the skeletal joint to other joints and to the state of the skeletal joint in other frames. Obtain a plurality of frames comprising coordinates of the skeletal joint and coordinates of other joints. Produce a spatially masked frame by masking the original coordinates of the skeletal joint. Provide the specific frame, the spatially masked frame, and at least one more frame to a coordinate prediction head of the BDSTT. Obtain, from the coordinate prediction head, a prediction of coordinates for the skeletal joint. Adjust parameters of the BDSTT until a mean-squared error, between the prediction of coordinates for the skeletal joint and the original coordinates of the skeletal joint, converges.

21 Claims, 18 Drawing Sheets

(51) Int. Cl.
*G06F 3/01* (2006.01)
*G06V 20/40* (2022.01)
*G06F 18/2133* (2023.01)

(52) U.S. Cl.
CPC .............. *G06T 7/246* (2017.01); *G06V 20/46* (2022.01); *G06T 2207/10016* (2013.01); *G06T 2207/20076* (2013.01); *G06T 2207/20084* (2013.01); *G06T 2207/30196* (2013.01); *G06V 2201/00* (2022.01)

(56) References Cited

U.S. PATENT DOCUMENTS

| | | | |
|---|---|---|---|
| 2019/0228579 A1* | 7/2019 | Kaifosh | G06T 19/00 |
| 2019/0244386 A1* | 8/2019 | Fisher | G06V 40/197 |
| 2020/0057425 A1* | 2/2020 | Seibert | G06T 19/006 |
| 2020/0058256 A1* | 2/2020 | Seibert | G06F 3/017 |
| 2020/0219284 A1* | 7/2020 | Tsang | G06T 7/251 |
| 2020/0322626 A1* | 10/2020 | Wang | G06V 40/23 |
| 2021/0012100 A1 | 1/2021 | Hoffmann | |

FOREIGN PATENT DOCUMENTS

| | | |
|---|---|---|
| CN | 107301370 A | 10/2017 |
| CN | 108960078 | 7/2018 |
| CN | 108764107 A | 11/2018 |
| CN | 109934881 | 6/2019 |
| CN | 110222653 A | 9/2019 |
| CN | 110532861 A | 12/2019 |
| CN | 111310707 | 6/2020 |
| CN | 111695523 A | 9/2020 |
| JP | 2013117406 | 6/2013 |
| WO | 2021048988 | 3/2021 |

OTHER PUBLICATIONS

Peter Mell et al., "The NIST Definition of Cloud Computing". Special Publication 800-145. NIST. Sep. 2011, pp. 1-7.
John E. Kelly III, "Computing, cognition, and the future of knowing", IBM Corp. Oct. 2015. pp. 1-7.
Univ. Toronto Machine Intelligence Team, "Deep Learning on Graphs for Computer Vision—CNN, RNN, and GNN." Oct. 2018. pp. 1-18.
Lei Shi, et al. "Decoupled Spatial-Temporal Attention Network for Skeleton-Based Action Recognition." arXiv:2007.03263v1. Jul. 2020. pp. 1-17.

* cited by examiner

SKELETON-BASED ACTION RECOGNITION USING BI-DIRECTIONAL SPATIAL-TEMPORAL TRANSFORMER

BACKGROUND

The present invention relates to the electrical, electronic, and computer arts, and more specifically, to computer vision.

SUMMARY

Principles of the invention provide techniques for skeleton-based action recognition using a bi-directional spatial-temporal transformer. In one aspect, an exemplary method includes instantiating a bi-directional spatial-temporal transformer neural network; and training the bi-directional spatial-temporal transformer neural network to predict original coordinates of a skeletal joint in a specific frame through relative relationships of the skeletal joint to other joints and to the state of the skeletal joint in other frames by: obtaining a plurality of frames comprising coordinates of the skeletal joint and coordinates of other joints; producing a spatially masked frame from the specific frame by masking the original coordinates of the skeletal joint; providing the specific frame, the spatially masked frame, and at least one more of the plurality of frames to a coordinate prediction head of the bi-directional spatial-temporal transformer network; obtaining from the coordinate prediction head a prediction of coordinates for the skeletal joint in the spatially masked frame; and adjusting parameters of the bi-directional spatial-temporal transformer neural network until a mean-squared error, between the prediction of coordinates for the skeletal joint and the original coordinates of the skeletal joint, converges.

One or more embodiments of the invention or elements thereof can be implemented in the form of a computer program product including a computer readable storage medium with computer usable program code for facilitating the method steps indicated. Furthermore, one or more embodiments of the invention or elements thereof can be implemented in the form of a system (or apparatus) including a memory that embodies computer executable instructions, and at least one processor that is coupled to the memory and operative by the instructions to facilitate exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a tangible computer readable storage medium (or multiple such media) and implemented on a hardware processor, or (iii) a combination of (i) and (ii); any of (i)-(iii) implement the specific techniques set forth herein.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

In view of the foregoing, techniques of the present invention can provide substantial beneficial technical effects. For example, one or more embodiments provide one or more of:

Improve technological process of machine detection of body posture by providing robust detection of body posture even in the presence of background image noise.

Accurate tagging of body postures with high-level semantic features (e.g., affect, action).

Some embodiments may not have these potential advantages and these potential advantages are not necessarily required of all embodiments. These and other features and advantages of the present invention will become apparent from the following detailed description of illustrative embodiments thereof, which is to be read in connection with the accompanying drawings.

DETAILED DESCRIPTION

Figure 1:
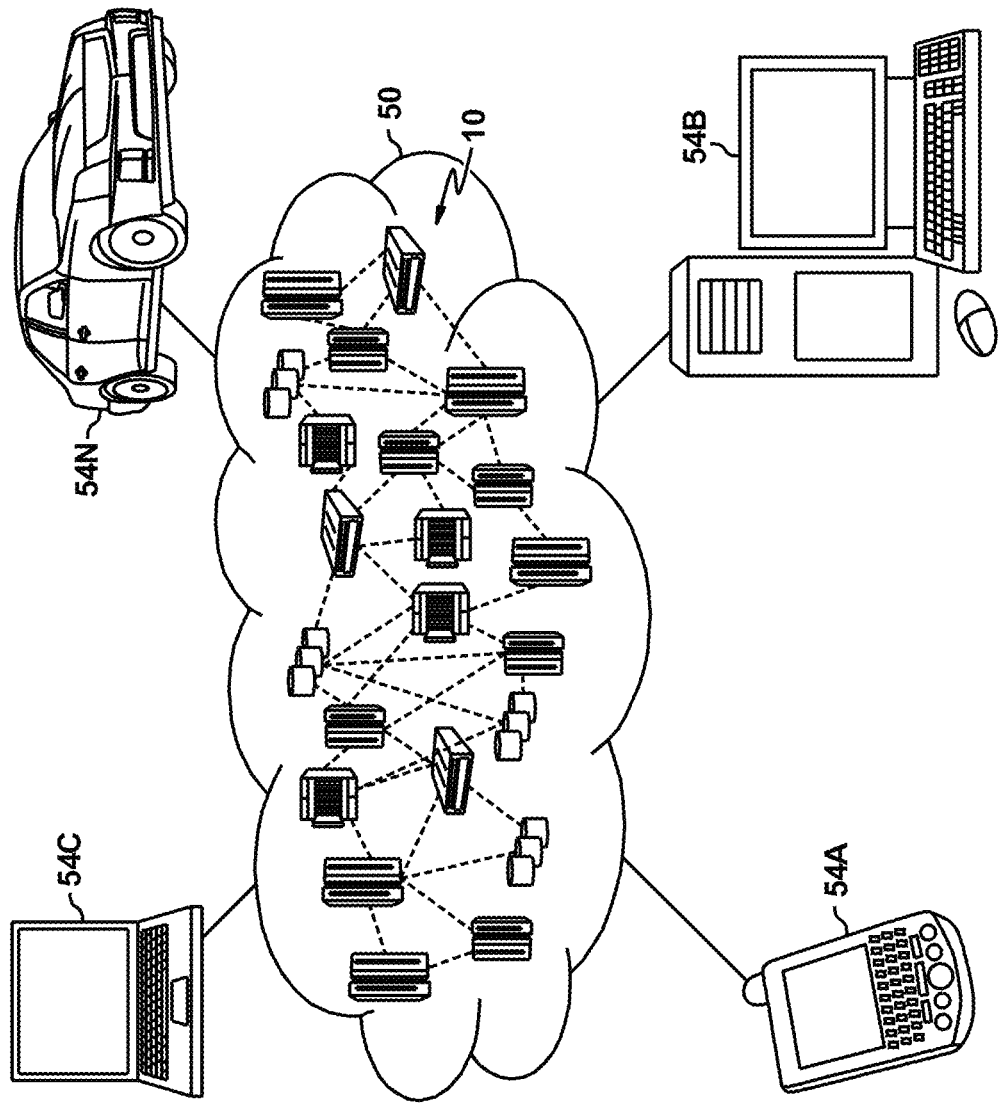
FIG. 1 depicts a cloud computing environment according to an embodiment of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
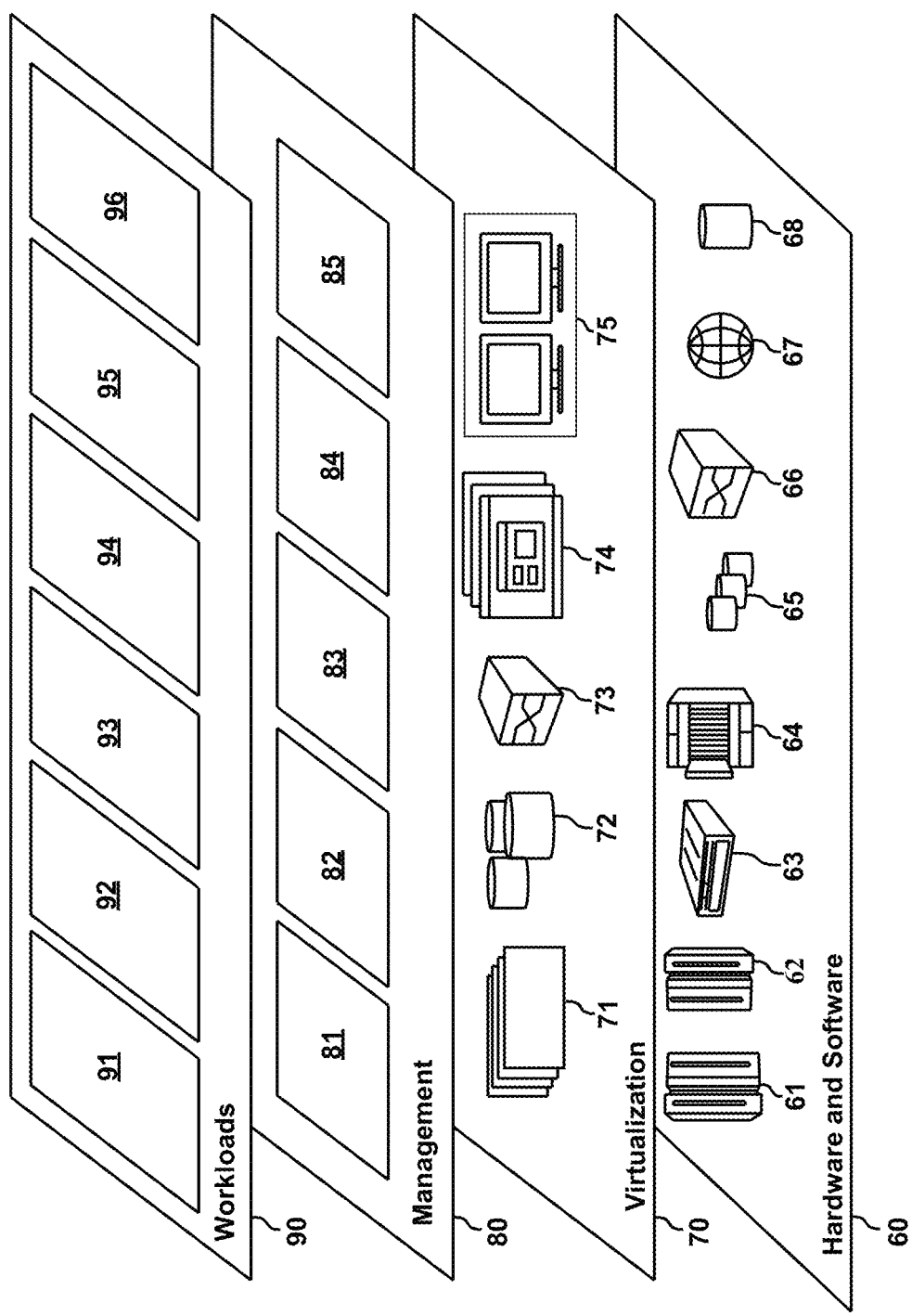
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a skeleton-based action recognition system 96 that incorporates a bi-directional spatial-temporal transformer, according to an exemplary embodiment.

Figure 3:
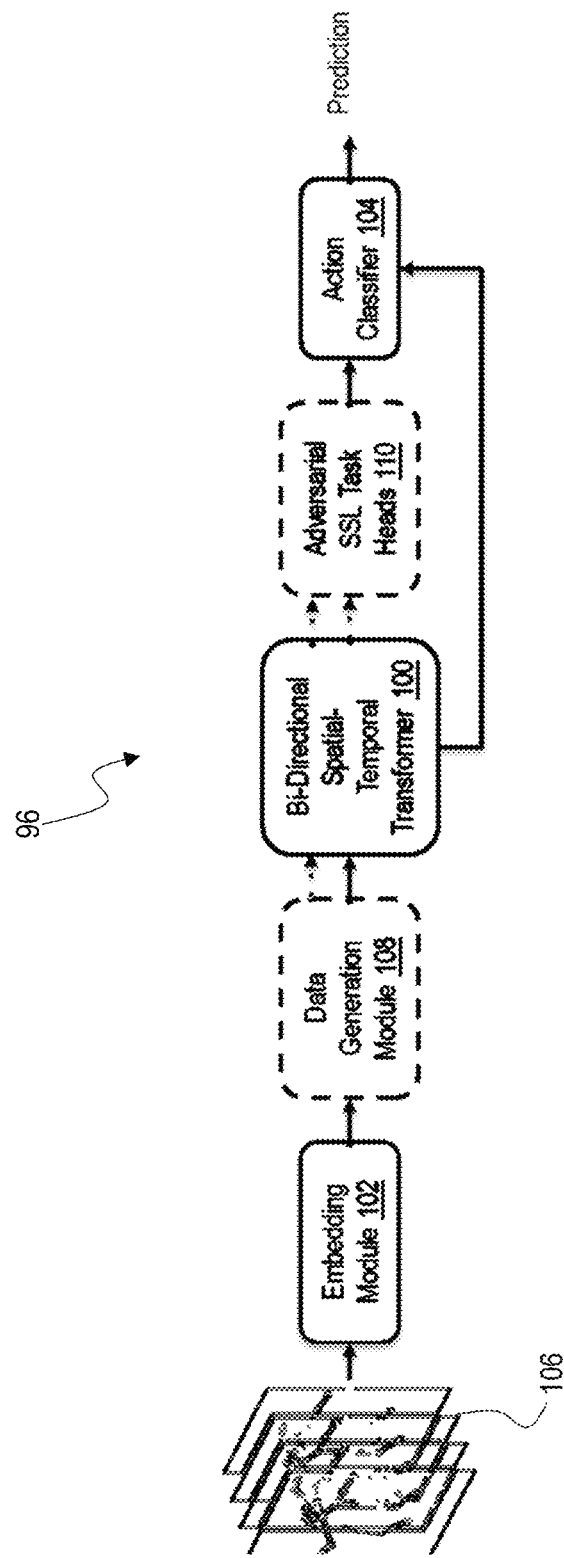
FIG. 3 depicts an overall architecture of a skeleton-based action recognition system that incorporates a bi-directional spatial-temporal transformer, according to an exemplary embodiment.

Referring to FIG. 3, the action recognition system 96 incorporates the bi-directional spatial-temporal transformer (BDSTT) 100. The BDSTT 100 includes two kinds of modules (shown in FIGS. 7 and 8), namely, a Spatial Transformer Block (STB) 112 shown in FIG. 7 and a Temporal Transformer Block (TTB) 114 (shown in FIG. 8). During normal operation (i.e., inferencing), the system 96 receives skeleton action frames 106 at an embedding module 102. The skeleton action frames 106 represent the positions of joints of a human skeleton moving through space and time. The embedding module 102 encodes the frames 106 as joint matrices X (further described below with reference to FIG. 6). During normal operation, the embedding module 102 passes the joint matrices 106 to the BDSTT 100, which produces features that are delivered to an action classifier 104 which carries out inferencing, using an averaging layer, a multi-layer perceptron, and a SoftMax optimizer, to generate a prediction. During training, a data generation module 108 produces joint matrices X that are passed through the BDSTT 100 to adversarial self-supervised learning task heads (SSL heads) 110. The SSL heads 110 adjust weights and/or parameters of the BDSTT 100 to improve accuracy of the features produced by the BDSTT 100.

Figure 4:
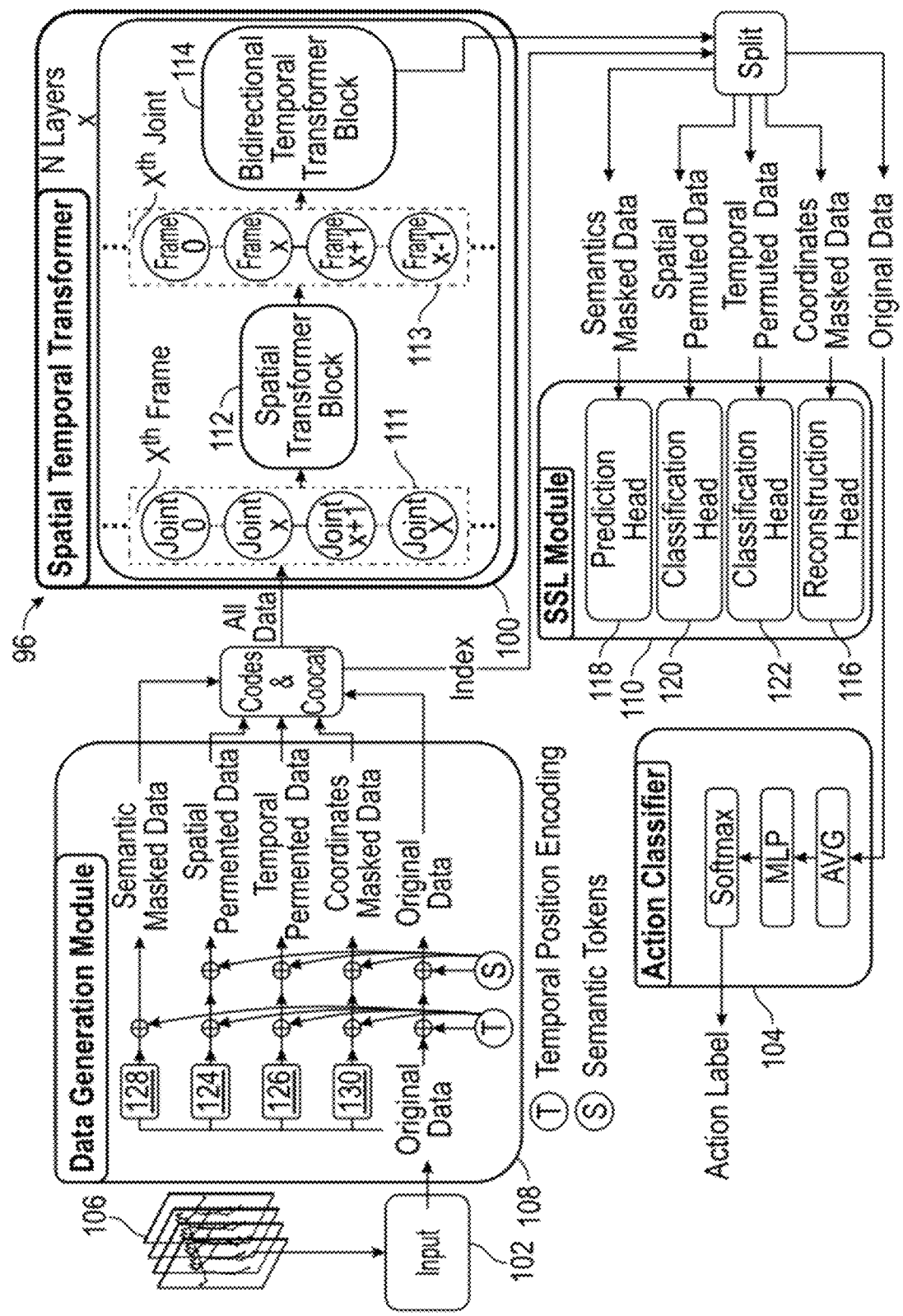
FIG. 4 depicts details of an embodiment of the architecture of FIG. 3.

Referring to FIG. 4, in an embodiment of the system 96, the embedding unit 102 receives the frames 106 and produces spatial matrices 111 and temporal matrices 113. The embedding unit 102 performs an algorithm that maps spatial features of the images in the frames 106, as will be familiar to those skilled in computer vision programming. The BDSTT 100 has the STB 112 and the TTB 114 arranged sequentially so that the STB processes spatial matrices 111 and then the TTB processes temporal matrices 113. The SSL heads 110 include a coordinate prediction (reconstruction) head 116, a joint classification (semantic) head 118, a spatial ordering head 120, and a temporal ordering head 122. The data generator 108 receives the original frames 106, and includes a spatial permutation unit 124, a temporal permutation unit 126, a semantic token mask 128, and a coordinates token mask 130. The spatial permutation unit 124 performs an algorithm to spatially segment the frames 106 and to randomly or pseudo-randomly rearrange them (shuffle them in space). The temporal permutation unit 126 performs an algorithm to shuffle the frames 106 in time. The semantic token mask 128 replaces zeros for some elements of one-hot semantic vectors, which identify the joints by type. The coordinates token mask 130 replaces zeros for some coordinates in the spatial matrices 111.

Figure 5:
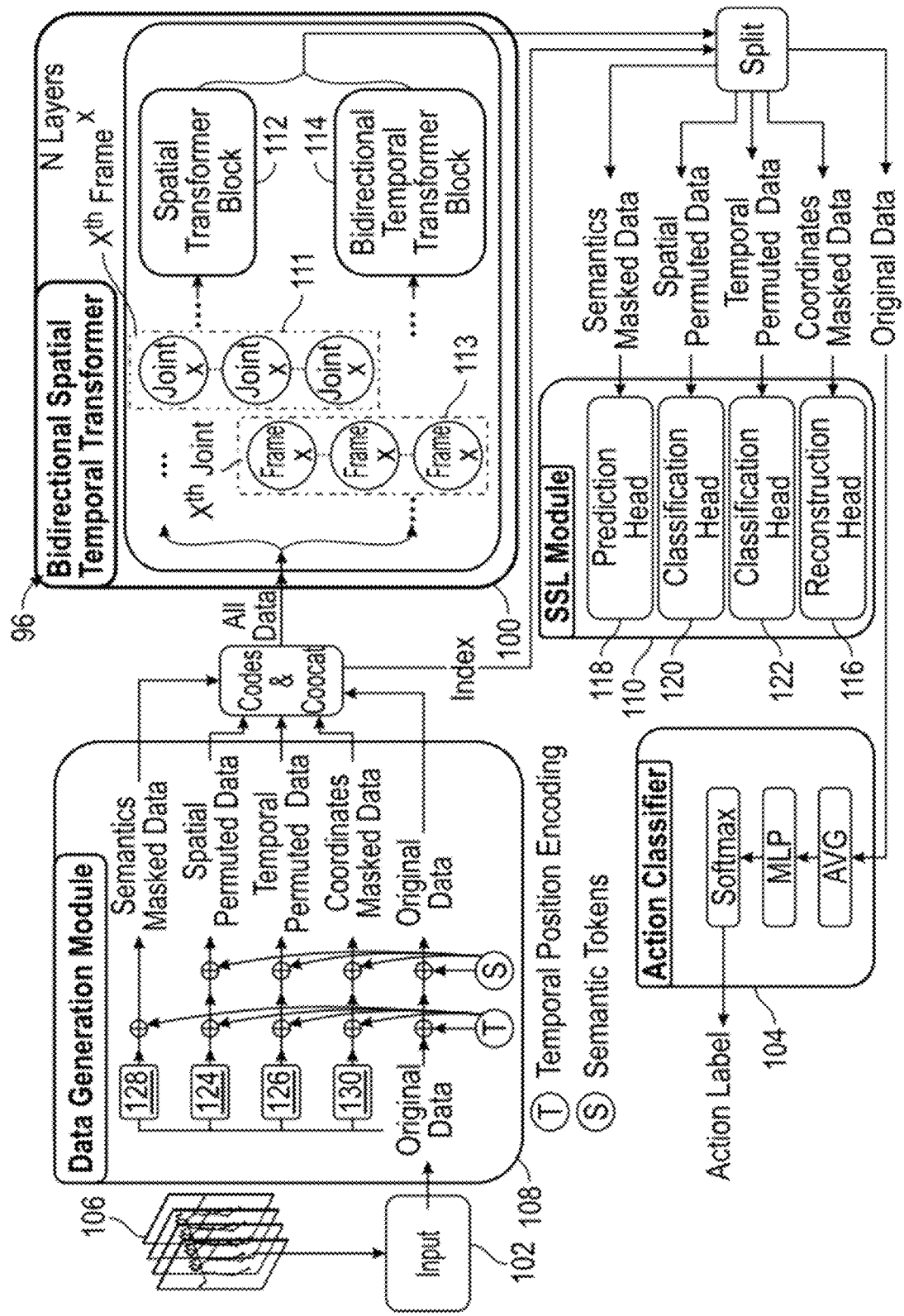
FIG. 5 depicts details of another embodiment of the architecture of FIG. 3.

FIG. 5 depicts another embodiment, in which the STB 112 and the TTB 114 are arranged in parallel so that they simultaneously process the spatial matrices 111 and the temporal matrices 113; then, the results are concatenated. The remaining elements in FIG. 5 are similar to those in FIG. 4 as described elsewhere herein.

Figure 6:
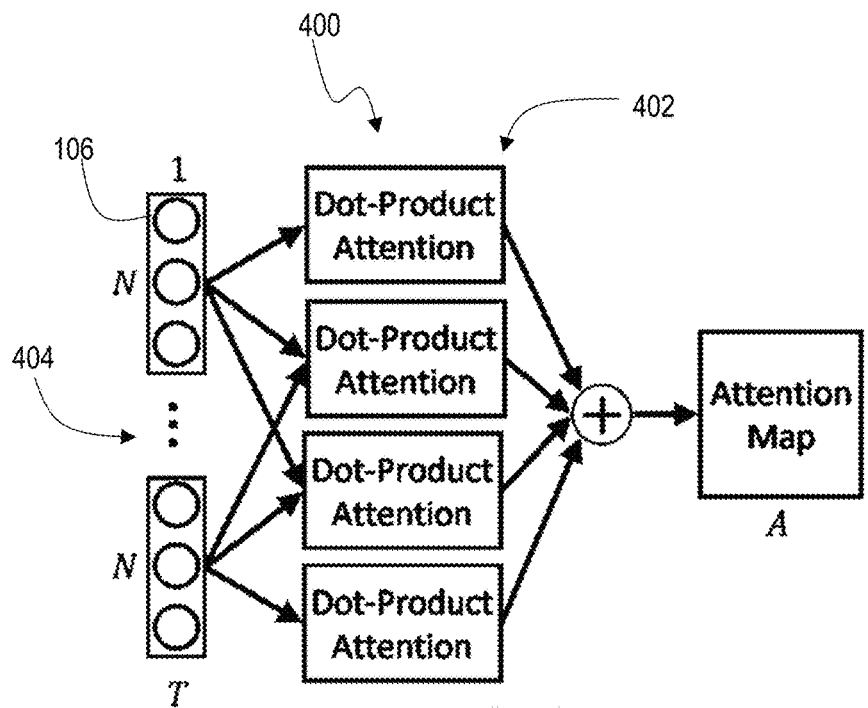
FIG. 6 depicts an architecture of a vector transformer, according to an exemplary embodiment.

Generally, FIG. 6 depicts a generic Transformer Block 400, which utilizes a self-attention mechanism 402 to capture relationships between all input elements 404. Assuming the matrix $X \in \mathbb{R}^{N \times C}$ represents all elements 404 of a skeleton action frame 106, where N is the number of elements and C is the channel number of each vector representing each item, an attention operation includes two steps: (1) obtaining attention map A, (2) giving new representation to all elements based on the attention map. Attention map A represents the correlations between all elements 404, and is obtained by taking the dot product of linear transformed input, i.e.:

$$A = \text{Attention}(X) = \text{SoftMax}\left(\frac{\phi(X) \cdot \varphi(X)^T}{\sqrt{C^{hidden}}}\right)$$

where $\phi$ and $\varphi$ are two different trainable linear transformations that share the output channel $C^{hidden}$. Item $A_{ij}$ in A represents the correlation score between element i and element j.

In one or more embodiments, X is a square matrix, i.e., N=C. It can be contemplated that for some embodiments, C>N to provide hidden channels or hidden dimensions that enable additional intermediate features.

On the basis of attention map A, a hidden representation H of all elements is produced as:

$$H = \text{LayerNorm}(\psi(AX) + X)$$

where $\psi$ is a linear translation and LayerNorm is a layer normalization function. Thus, in one or more embodiments, shortcut connections are applied to improve stability of the model.

In FIG. 6, the self-attention mechanism 402 makes use of a multi-head strategy as applying several respective self-attention operations and concatenating all the outputs as a single aggregated multi-head output. Given the input X 404, update X in the Transformer Block 400 according to $$X = \text{LayerNorm}(H + FF(H))$$

where FF is any row-wise feedforward (fully connected) layer of a neural network (i.e., FF processes features of each element independently and identically). In other words, X can be updated as $$X = F(X, A)$$

and the entire Transformer Block can be represented as $$TB(X) = F(X, Att(X)).$$

Generally, a neural network includes a plurality of computer processors that are configured to work together to implement one or more machine learning algorithms. The implementation may be synchronous or asynchronous. In a neural network, the processors simulate thousands or millions of neurons, which are connected by axons and synapses. Each connection is enforcing, inhibitory, or neutral in its effect on the activation state of connected neural units. Each individual neural unit has a summation function which combines the values of all its inputs together. In some implementations, there is a threshold function or limiting function on at least some connections and/or on at least some neural units, such that the signal must surpass the limit before propagating to other neurons. A neural network can implement supervised, unsupervised, or semi-supervised machine learning. A common approach to training a neural network is to calculate a "loss" or difference between a "true" value and a value predicted by the network, then repeatedly adjust weights of the neurons in the network and re-calculate the loss, until the loss converges, i.e., the loss remains within a threshold value for a number of iterations. For example, a loss can be said to converge if it changes by no more than 5% over three iterations; or if it changes by no more than 1% over five iterations; or if it changes by no more than 2% over two iterations. Selecting a convergence condition is a matter of design choice within the purview of an ordinary skilled worker, given the teachings herein.

Figure 7:
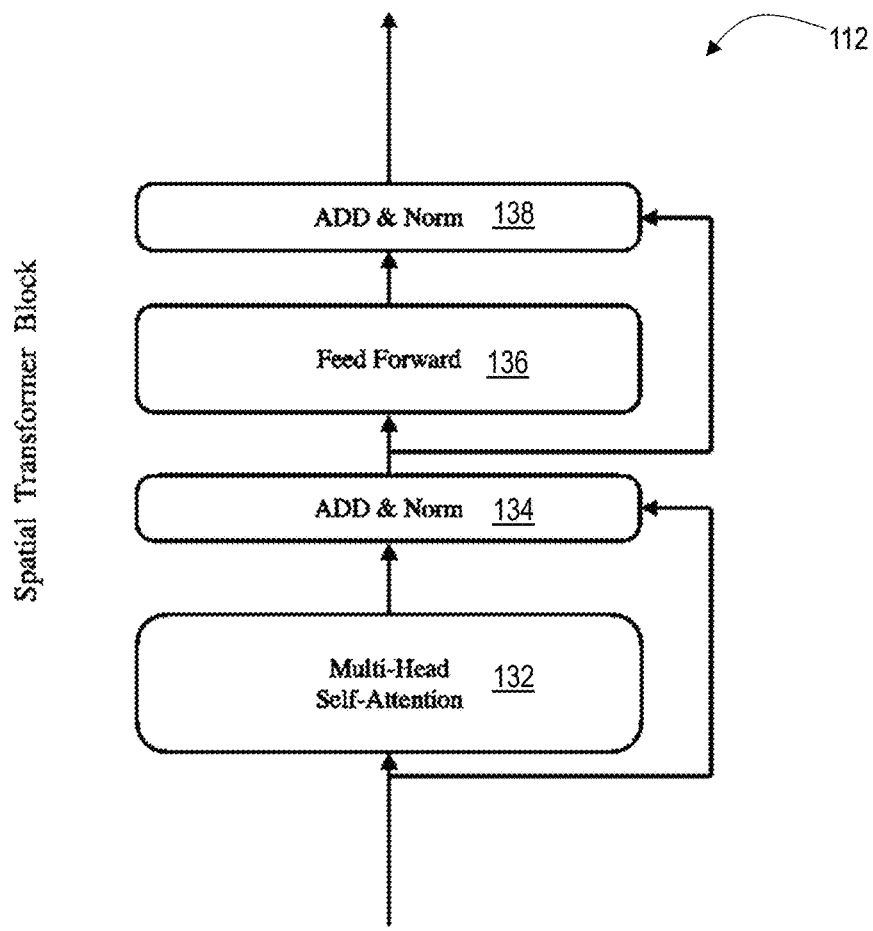
FIG. 7 depicts an architecture of a spatial transformer, according to an exemplary embodiment.

FIG. 7 depicts the Spatial Transformer Block (STB) 112, which is a specialized Transformer Block that models the skeletal posture of each frame by computing relationships between joints. The STB 112 makes use of a multi-head attention setup as shown in FIG. 6. In the STB 112, matrix X is a joint×channel matrix and there is a sequence of T matrices, in which each matrix $X^t$ in the sequence corresponds to a frame t, where $1 \le t \le T$ and T is the number of frames. It is helpful to have the model distinguish types of joints, i.e., "neck" or "elbow." For this purpose, one-hot classification vectors are added to the joint matrix, e.g.:

$$\hat{X}^t = X^t + P_S$$

where $P_S \in \mathbb{R}^{S \times C}$ is a matrix of one-hot semantic token vectors, which is trained jointly with the whole model. S is the number of joints, while C is the number of channels. In one or more embodiments, the number of channels C=S the number of joints.

According to the attention map equation, an attention map $A^t$ of frame t can be obtained as $A^t \in \mathbb{R}^{S \times S}$. To increase stability of the model, attention maps of all frames are averaged and shared.

Thus, the STB 112 incorporates a multi-head self-attention unit 132, which implements the self-attention mechanism 402 described with reference to FIG. 6. The STB 112 also incorporates two ADD & Normalization blocks 134, 138 as well as a feed-forward (or multi-layer perceptron) layer 136.

Figure 8:
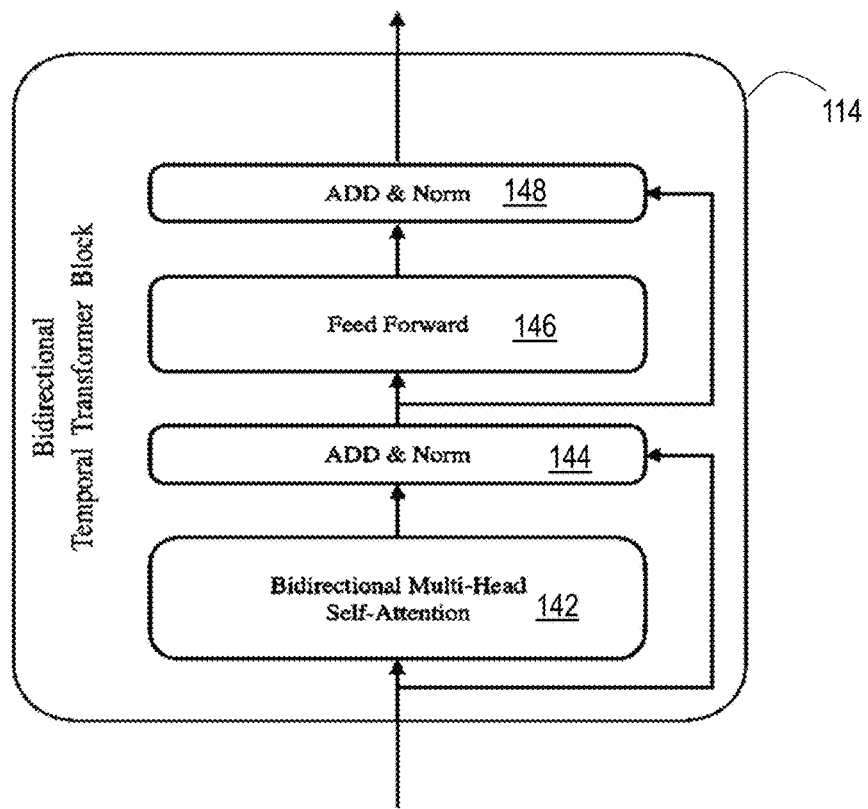
FIG. 8 depicts an architecture of a temporal transformer, according to an exemplary embodiment.

FIG. 8 depicts the Temporal Transformer Block (TTB) 114, which is a specialized Transformer Block that captures posture changes over long time spans and is able to model the entire sequence of posture changes. A difference of the TTB 114 from the STB 112 is that the TTB incorporates a bi-directional multi-head self-attention unit 142, which implements a variation (further described below) of the self-attention mechanism 402 that was previously described with reference to FIG. 6. The TTB 114 also incorporates two ADD & Normalization blocks 144, 148 as well as a feed-forward (or multi-layer perceptron) layer 146.

Figure 9:
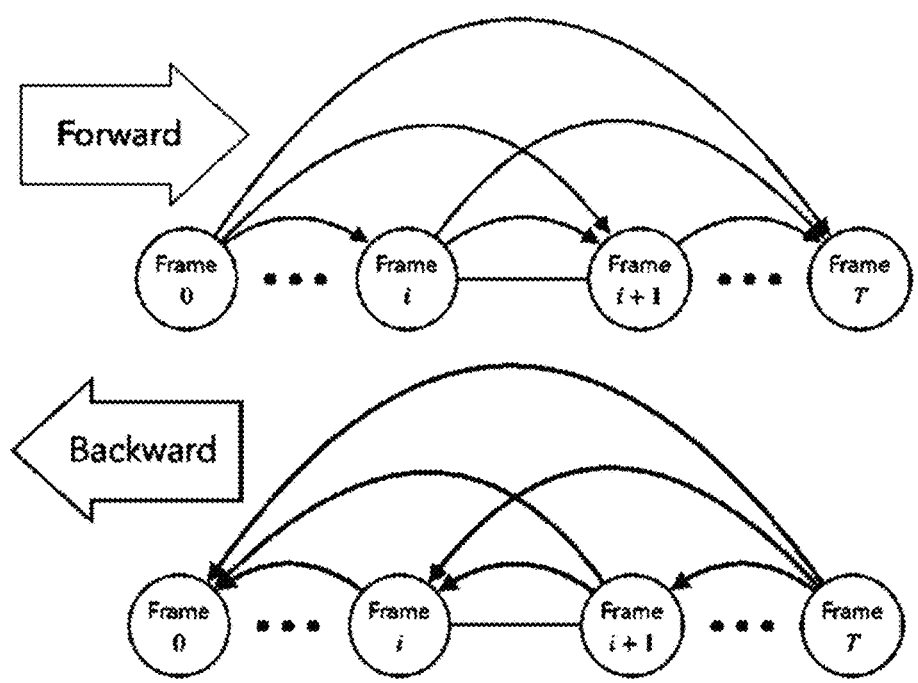
FIG. 9 depicts forward and backward temporal masking of skeleton frames for bi-directional self-attention.

FIG. 9 illustrates operation of the unit 142. The sequence of $s^{th}$ joint in all frames $X^S \in \mathbb{R}^{T \times C}$, where $1 \le s \le S$. S; T; C have the same meaning as for the STB 112. For the temporal dimension, the model is designed to distinguish the order of time series. First, different frequencies of sine and cosine functions are used to encode position of each joint s for each frame t, e.g., $$P_{T(p,2i)} = \sin\left(\frac{p}{10000^{\frac{2i}{C}}}\right)$$

$$P_T(p, 2i+1) = \cos\left(\frac{p}{10000^{\frac{2i}{C}}}\right)$$

Then position encoding $P_T$ is added to each input frame $X^S$ as $\hat{X}^S = X^S + P_T$.

However, the periodic symmetry of trigonometric functions can confuse the ordering of frames. Accordingly, the TTB 114 is trained to disentangle a sequence of frames by applying a directional mask strategy to training data in order to force the model to recognize time order. A single self-attention operation, as in the Transformer Block 400, is replaced by one time-forward self-attention operation and one time-backward self-attention operation, as shown in FIG. 9. For the forward self-attention, $\hat{X}^S$ is masked by a triangle matrix of 1 s such that for each joint, each frame correlates only to the frames preceding it in time. For the backward self-attention, $\hat{X}^S$ is masked by a transpose triangle matrix of 1 s such that for each joint, each frame correlates only to the frames succeeding it in time. Thus, for the TTB 114, $$A_{f/b} = \text{Attention}_{f/b}(X) = \text{SoftMax}\left(M_{f/b} + \frac{\phi(X) \times \varphi(X)^T}{\sqrt{C^{hidden}}}\right).$$

In the above, f/b means forward or backward and $M_{f/b}$ means the masks for forward or backward directional self-attention.

An aspect of the invention is self-supervised training of the BDSTT 100. Self-supervised learning aims to learn feature representations from a huge amount of unlabeled data. For example, self-supervised learning helps the BDSTT 100 to learn high-level semantic information in actions represented by skeleton sequences. Four adversarial self-supervised learning tasks deal with different exception situations in skeleton-based action recognition. Referring back to FIGS. 4 and 5, these adversarial self-supervised learning tasks include a Coordinates Prediction Task performed by coordinate prediction head 116, a Joint Type (Semantic) Prediction Task performed by semantic head 118, a Spatial Order Prediction Task performed by spatial ordering head 120, and a Temporal Order Prediction Task performed by temporal ordering head 122. In the equations describing these tasks, the BDSTT 100 is represented as an encoder f(•).

In one or more embodiments, a skeleton-based model perceives the law of posture changes. Thus, it is advantageous for a skeleton-based model, such as the BDSTT 100, to predict the coordinates of a joint in a specific frame through the relative relationship with other joints and the state of the joint in other frames. To train BDSTT 100 for such prediction, the data generator 108 masks the original coordinates of some joints in some frames by setting the masked coordinates to zero according to a certain proportion, and keeps the rest of the joints unchanged. An appropriate proportion can be selected heuristically by an ordinary skilled worker according to the details of a given application. For example, setting about 15% of the coordinates to zero can enhance the training of the BDSTT 100 and particularly the STB 112 (other embodiments can use other values). Define the randomly masked data as $X_{masked}$. The encoder f(•) 100 reads the input sequences and extracts representations from inputs; then, the coordinate prediction head, $h_C$(•) 116, receives the learned representations and generates sequences to reconstruct or predict the coordinates of all joints in the input sequences. Like the other heads 118, 120, 122, the coordinate prediction head $h_C$(•) is a neural network. Parameters of the network for $h_C$(•) are estimated using a mean-squared error (MSE) loss function $L_{PC}$, as follows:

$$L_{PC} = \sum_{1}^{S}\sum_{1}^{T}\|h_C(f(X_{masked})) - X\|_2^2$$

Thus, BDSTT 100 learns like an autoencoder but the inputs are a token sequence with data set to 1 or 0 for specific values. The reconstruction head 116 is a neural network that is trained to predict the original coordinates of masked joints from the coordinates of unmasked joints. In other words, the reconstruction head 116 is trained on an artificially incomplete set of fully-known coordinates so that it can predict missing coordinates in other sets of coordinates that are not fully known.

Semantic tokens help the model BDSTT 100 distinguish types of joints and appropriate motion envelopes. Advantageously, a superior skeleton-based model has the ability to infer types of joints from motion history and relative positional relationships with other joints. To train BDSTT 100 for this inference ability, the data generator 108 removes semantic tokens of some percentage of joints in the encoder and delivers the masked matrix X to a joints type (semantic) prediction head $h_J$(•) 118, which is trained by a cross-entropy classification loss function $L_{Pj}$:

$$L_{PJ} = \sum_{1}^{S} -y^i \log h_J(f(X_{NonS}^i))$$

To reduce the impact of wrong spatial ordering of joints, the BDSTT 100 can be trained to predict a correct spatial permutation of joints that have been spatially shuffled into a matrix $X_{ShfS}$. In each sequence of joints, divided into $K_S$ equal segments, with $$\frac{S}{K_S}$$

joints in each segment, there are $K_S!$ ways to shuffle the segments. A spatial classification head $h_S$(•) 120 is trained to predict a correct spatial shuffling using cross-entropy loss $L_{PS}$:

$$L_{PS} = \sum_{1}^{K_S!} -y^i \log h_S(f(X_{ShfS}^i))$$

It is helpful if a skeleton-based model can ascertain correct temporal order for a potentially time-shuffled sequence of frames. To enhance the ability of BDSTT 100 to do this, the data generator 108 applies temporal order permutation to shuffled sequences $X_{ShfT}$. Divide each sequence into $K_T$ segments equally, with $$\frac{T}{K_T}$$

frames in each segment; then there are $K_T!$ ways to shuffle the segments, and a temporal classification head $h_T$ 122 can be trained to predict the accurate shuffling based on a cross-entropy loss formula $L_{PT}$:

$$L_{PT} = \sum_{1}^{K!} -y^i \log h_T(f(X_{ShfT}^i))$$

Figure 10:
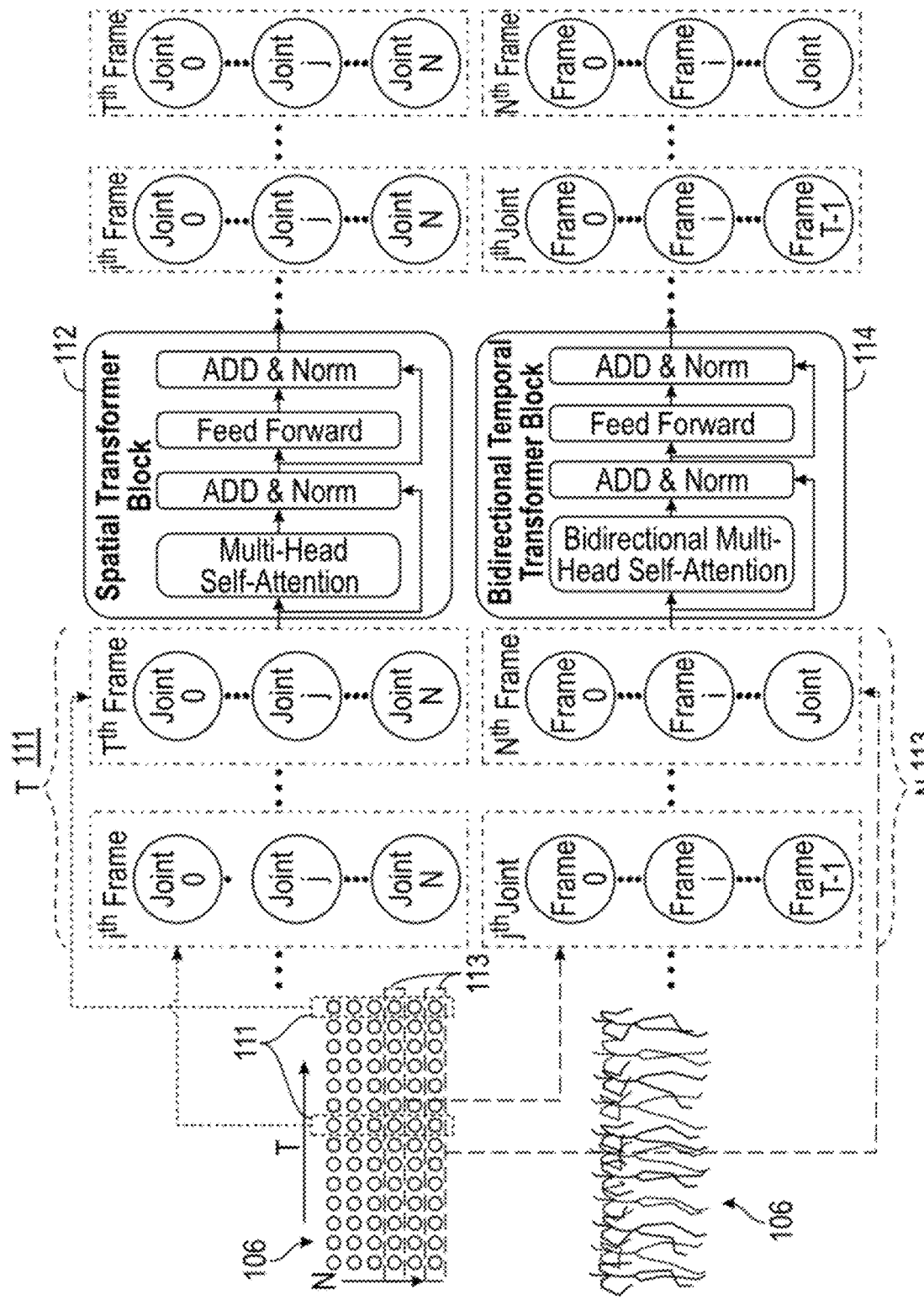
FIG. 10 depicts data flow through an architecture according to FIG. 7.

FIG. 10 depicts data flow through an architecture as shown in FIG. 7. From the frames 106, the embedding unit 102 (shown in FIG. 3, FIG. 4, and FIG. 5, not shown in FIG. 10) produces frame-wise (spatial) matrices 111 and joint-wise (temporal) matrices 113. The STB 112 receives the spatial matrices 111 and produces a matrix describing skeletal posture features in each frame. The TTB 114 receives the temporal matrices 113 and produces a matrix describing evolution of skeletal posture features across a sequence of frames.

Figure 11:
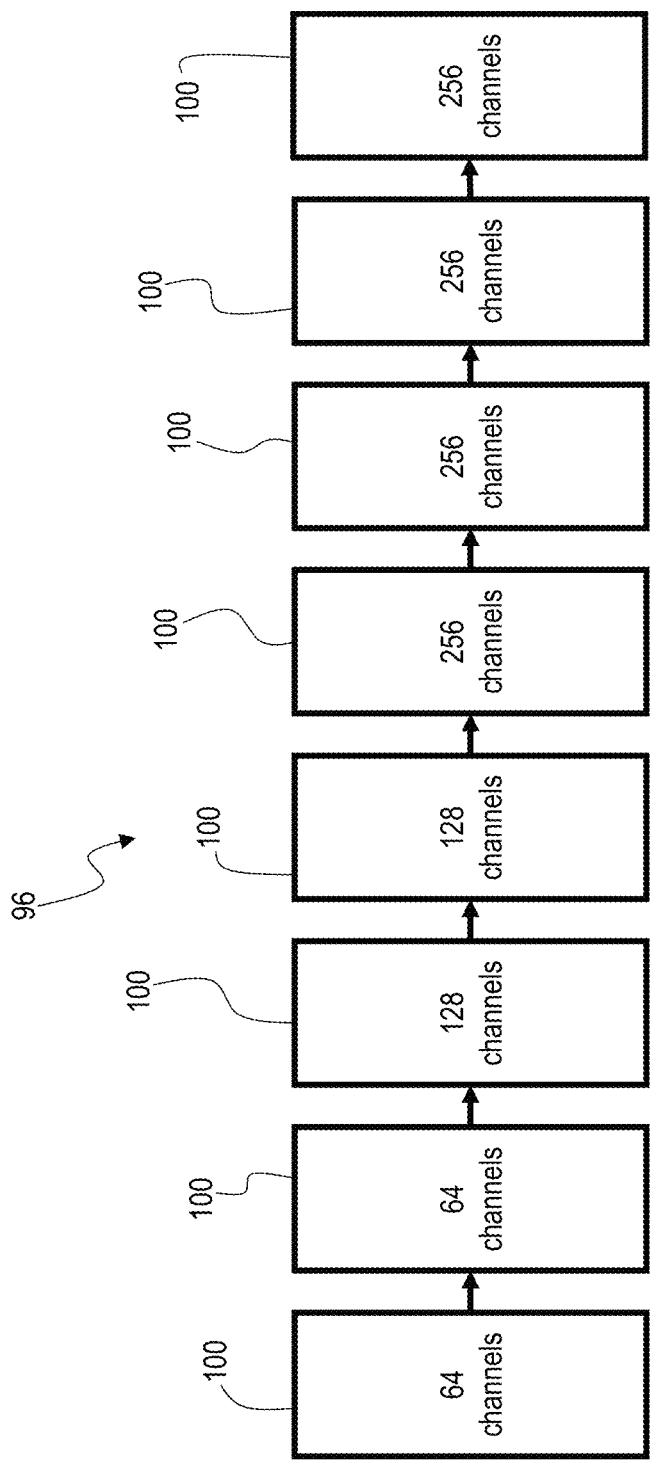
FIG. 11 depicts an architecture of a skeleton-based action recognition system that incorporates a plurality of bi-directional spatial-temporal transformers, according to an exemplary embodiment.

In one or more embodiments, as shown in FIG. 11, the action recognition system 96 is stacked with eight (8) instances of the BDSTT 100, where the instances have 64, 64, 128, 128, 256, 256, 256, and 256 output channels, respectively. Each of the BDSTTs 100 contains a Spatial Transformer Block 112 and a Temporal Transformer Block 114, in parallel with three (3) heads of a multi-head attention network. In one or more embodiments, the system 96 also includes a pre-processor that randomly and uniformly samples all skeleton sequences to 150 frames and then randomly and centrally crops the sampled sequences to 128 frames for training/test splits. In one or more embodiments, the system 96 is trained for 120 epochs with batch size 32, using stochastic gradient descent with Nesterov momentum 0.9. In one or more embodiments, the initial learning rate (LR) is set to 0.1 with step LR decay (factor 0.1) at epochs 60 and 90.

Figure 22:
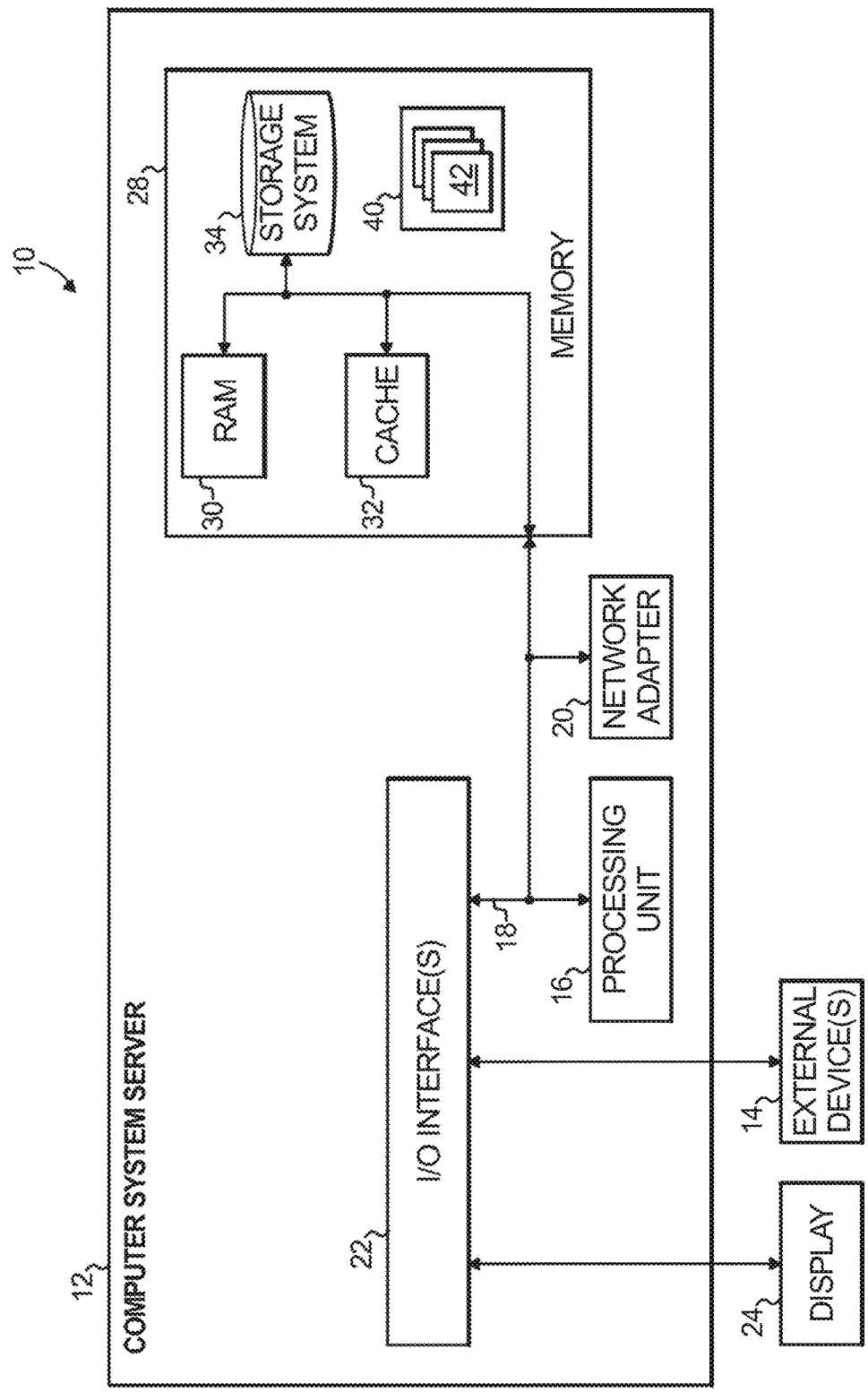
FIG. 22 depicts a computer system that may be useful in implementing one or more aspects and/or elements of the invention, also representative of a cloud computing node according to an embodiment of the present invention.

Embodiments of the invention have numerous practical applications. One non-limiting exemplary application for embodiments of the invention is in the realm of household appliance control. Another non-limiting exemplary application is in the realm of vehicle control. In both fields, it can be helpful to permit a user to adjust the operation of a device (e.g., refrigerator, automobile, wheelchair) without touching controls of the device. For example, a camera associated with a device can capture images (frames) of the user's movements, and the system 96 can process the frames to detect a skeletal joint motion sequence by application of the trained bi-directional spatial-temporal transformer network 100 to the frames. In response to the detected skeletal joint motion sequence, the system 96 can transmit a control signal to the device. For example, the system 96 can be implemented in a computer system/server 12 (or in a microprocessor without peripherals such as a monitor and keyboard), as shown in FIG. 22, which is connected in communication with an external electromechanical, electrooptical, or electronic device 14 via input/output interface 22. The system 96 can transmit the control signal to the device 14 via the input/output interface 22 in response to detecting the skeletal joint motion sequence by operation of the trained bi-directional spatial-temporal transformer network 100.

Figure 12:
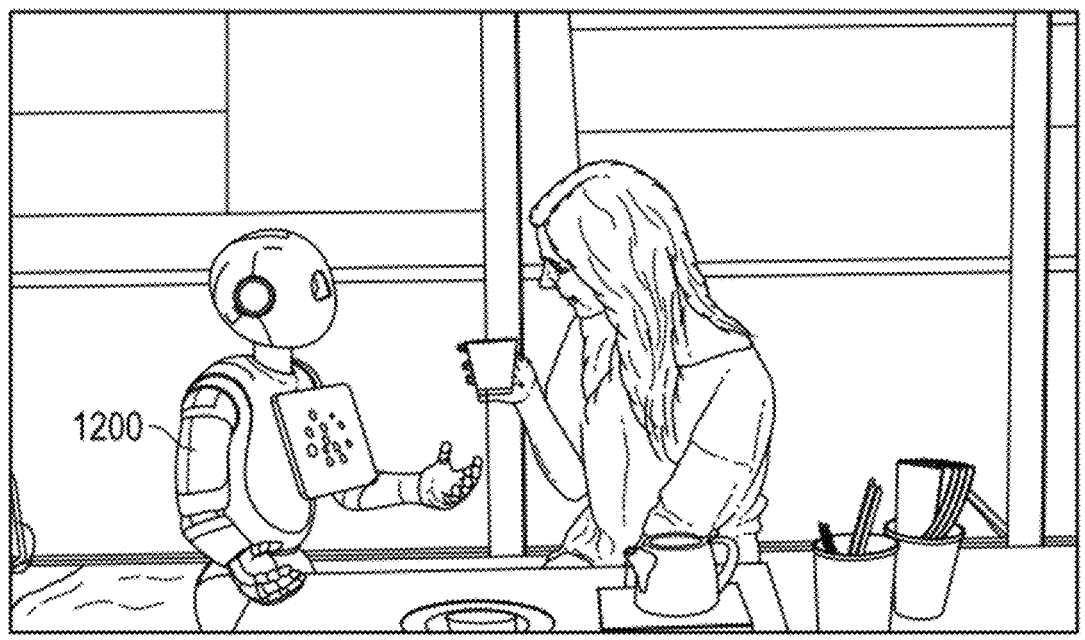
FIG. 12 depicts a household appliance using a skeleton-based action recognition system to interpret a user's behavior.

FIG. 12 depicts a household appliance (robot) 1200 using the skeleton-based action recognition system (not shown in FIG. 12) to interpret a user's behavior. Based on the action recognition, the robot can provide specific services. For one example, in family services, a robot can understand people's behaviors and intentions. In FIG. 12, the robot faces the person and is ready to collect or clean when it recognizes that the person is drinking water.

Figure 13:
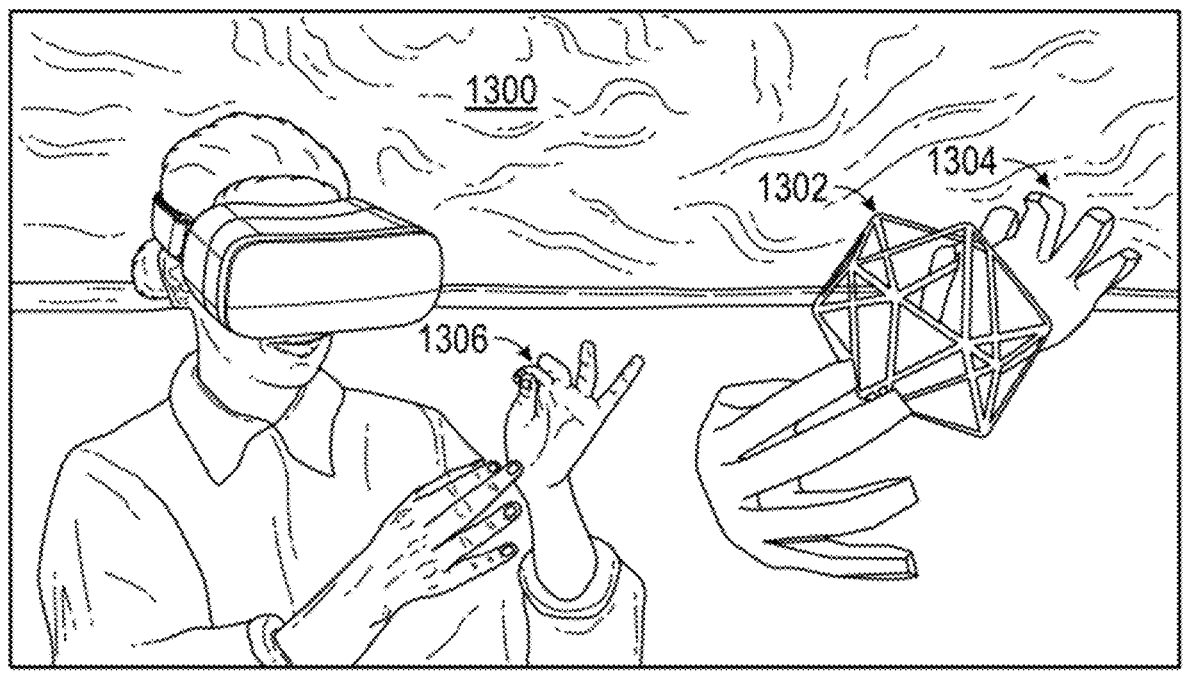
FIG. 13 depicts a virtual reality system using a skeleton-based action recognition system to interpret a user's behavior.

FIG. 13 depicts a virtual reality system 1300 using a skeleton-based action recognition system to interpret a user's behavior, so that people can easily use actions/gestures to interact with the VR system 1300 instead of using bulky controllers. In FIG. 13, the VR system 1300 rotates a virtual object 1302 in the user's virtual hands 1304 response to detecting skeleton joint motion sequences of the user's actual hands 1306.

Figure 14:
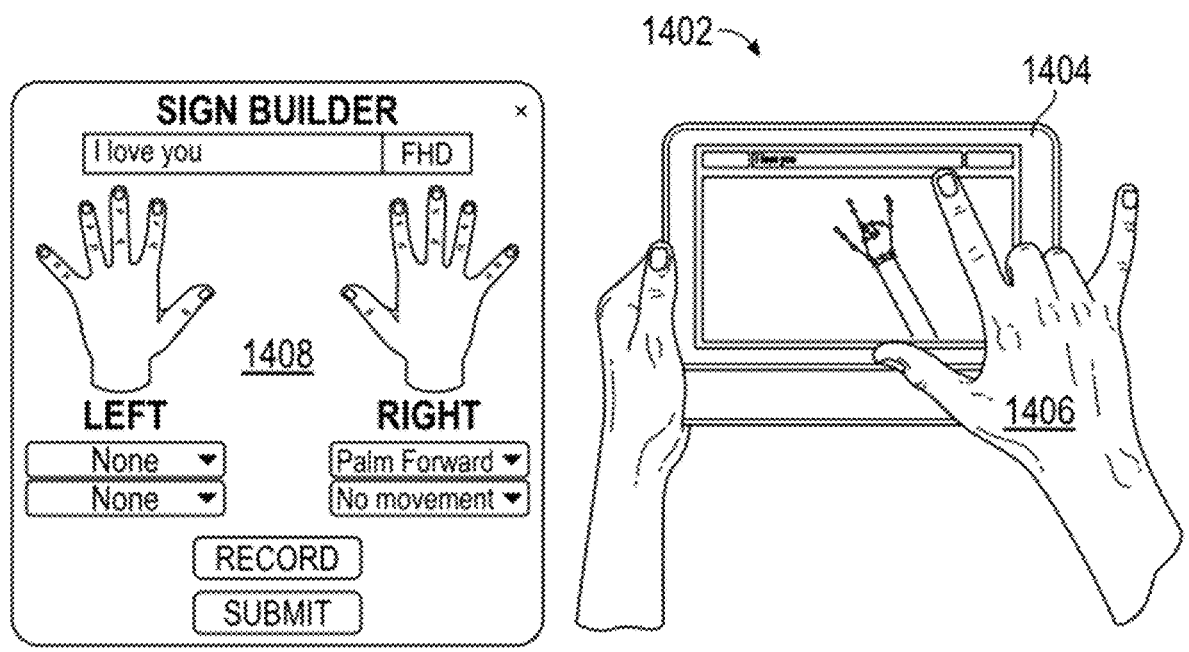
FIG. 14 depicts a real-time translator system using a skeleton-based action recognition system to interpret a user's behavior.

FIG. 14 depicts a real-time translator system using a skeleton-based action recognition system to interpret a user's behavior. The skeleton-based action recognition can work in sign language translation systems to help deaf people/people who do not articulate speech communicate with hearing people. In FIG. 14, a handheld electronic device 1402 uses its camera 1404 to capture a gesture of a user's hand 1406 and applies skeleton-based action recognition to look up the gesture in a gestures database 1408 for translation to speech.

Figure 15:
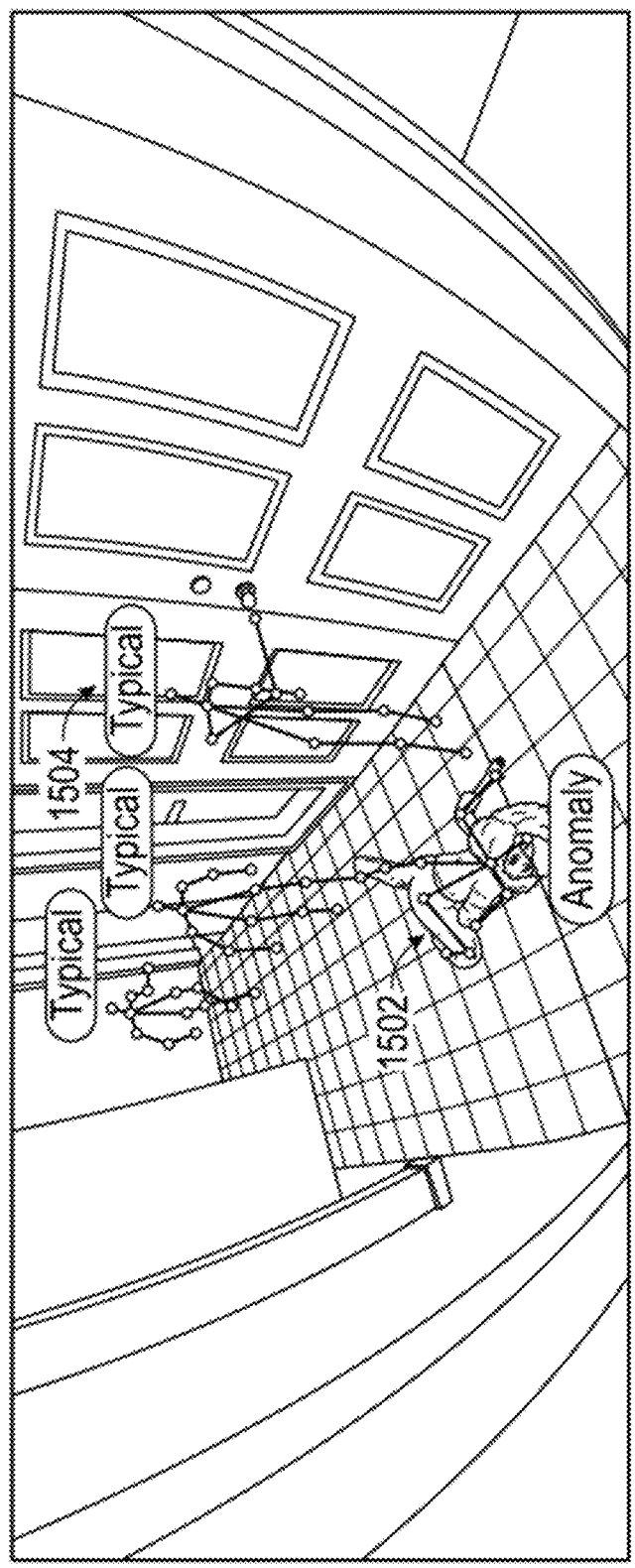
FIG. 15 depicts a safety monitoring system using a skeleton-based action recognition system to interpret a user's behavior.
Figure 16:
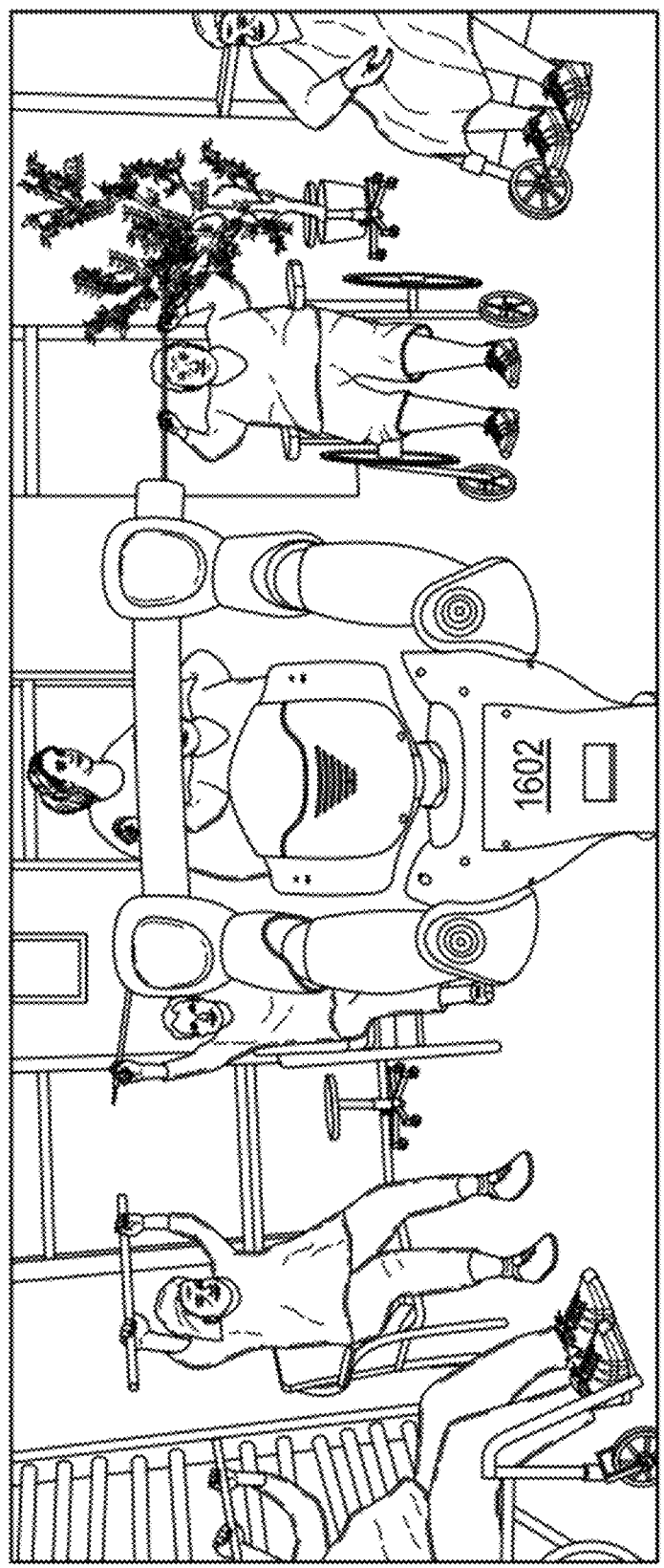
FIG. 16 uses a neuromuscular health assessment system using a skeleton-based action recognition system to interpret users' behaviors.

Another practical application is for the remote monitoring and care of vulnerable groups. For vulnerable groups, such as the elderly and children, abnormal behavior detection with skeleton-based action recognition scheme is very useful. FIG. 15 depicts an example in which a skeleton joint motion sequence 1502 is detected and compared to a "normal" sequence 1504, the system 96 (not shown in FIG. 15) could alert a guardian/caretaker/hospital staff when abnormal motion is detected. FIG. 16 depicts a medical robot 1602 that implements a neuromuscular health assessment system, which uses a skeleton-based action recognition system to interpret users' behaviors.

Figure 17:
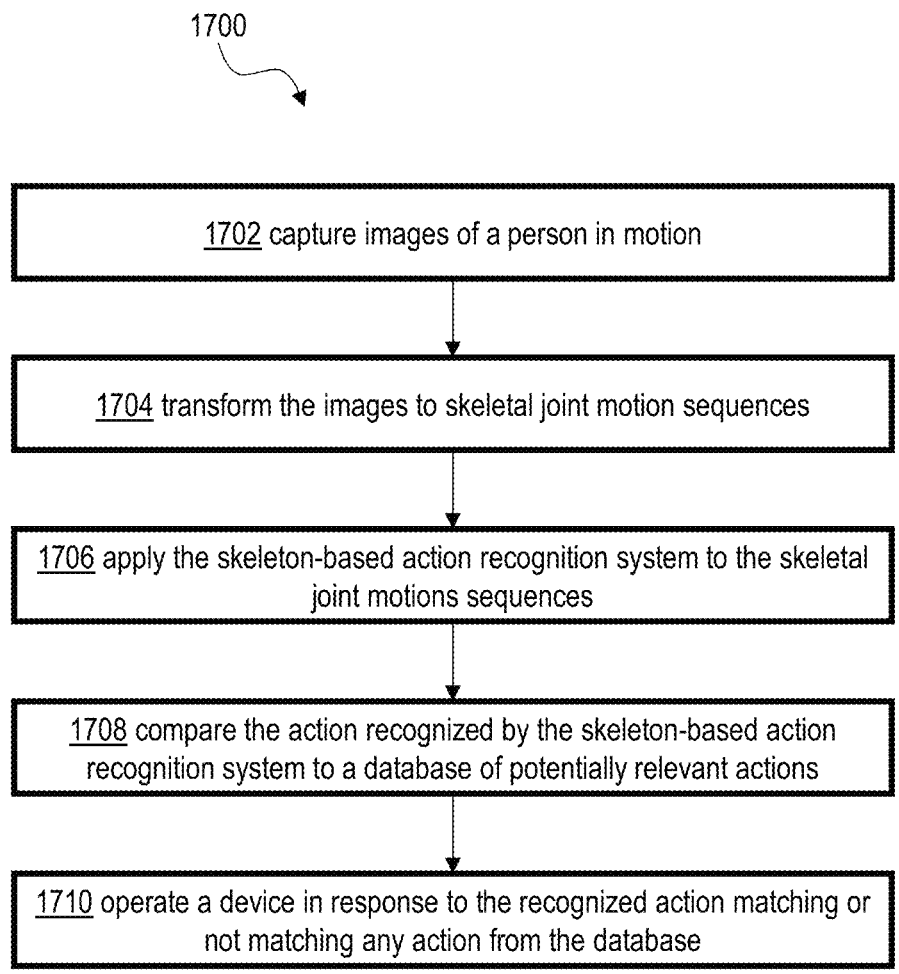
FIG. 17 depicts steps of a method for interpreting the results of a skeleton-based action recognition system.
Figure 18:
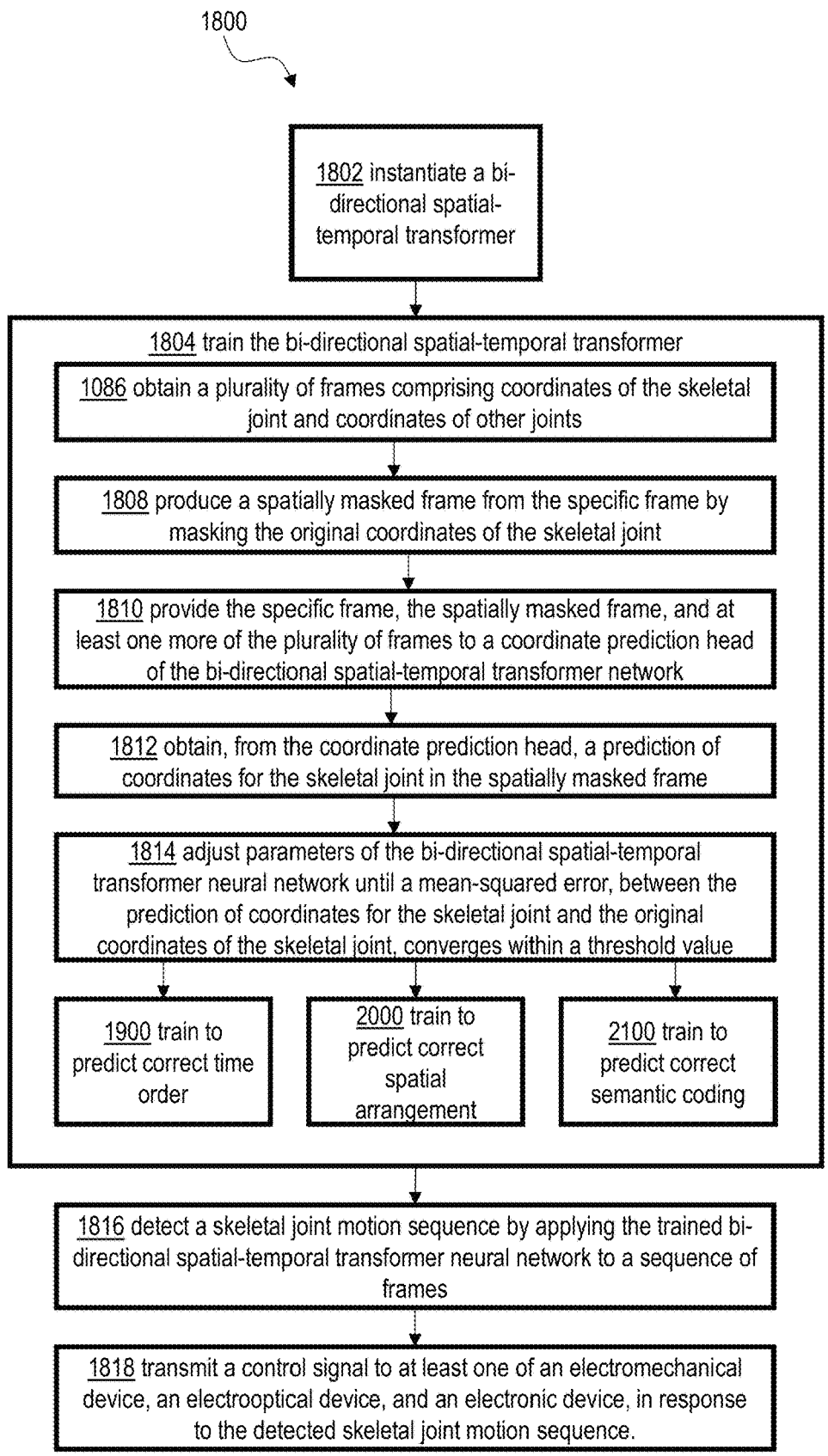
FIG. 18 depicts steps of a method for training and implementing a skeleton-based action recognition system.

FIG. 17 depicts steps of a basic method 1700 for implementing any of the practical applications of FIG. 12 through FIG. 16. At 1702, capture images of a person in motion. At 1704, transform the images to skeletal joint motion sequences. At 1706, apply the skeleton-based action recognition system to the skeletal joint motions sequences. At 1708, compare the action recognized by the skeleton-based action recognition system to a database of potentially relevant actions. At 1710, operate a device in response to the recognized action matching or not matching any action from the database. For example, in FIG. 12, operate the robot 1200 to take the glass of water when the person sets it down (matching a database action). In FIG. 15, operate an alerting buzzer (not shown) to bring staff when the person falls down instead of opening the door (not matching any database action).

Given the discussion thus far, and with particular reference to the accompanying FIG. 18 through FIG. 21, it will be appreciated that, in general terms, an exemplary method 1800, according to an aspect of the invention, includes at 1802 instantiating a bi-directional spatial-temporal transformer (BDSTT) neural network. At 1804, train the bi-directional spatial-temporal transformer neural network to predict original coordinates of a skeletal joint in a specific frame through relative relationships of the skeletal joint to other joints and to the state of the skeletal joint in other frames. An ordinary skilled worker will appreciate that prediction of the original coordinates, which already are known, is done for the purpose of training so that the prediction can be compared to ground truth and parameters of the BDSTT can be adjusted until the prediction approaches the original coordinates within a satisfactory limit. Training includes several steps. At 1806, obtain a plurality of frames comprising coordinates of the skeletal joint and coordinates of other joints. At 1808, produce a spatially masked frame from the specific frame by masking the original coordinates of the skeletal joint. At 1810, provide the specific frame, the spatially masked frame, and at least one more of the plurality of frames to a coordinate prediction head of the bi-directional spatial-temporal transformer network. At 1812, obtain, from the coordinate prediction head, a prediction of coordinates for the skeletal joint in the spatially masked frame. At 1814, adjust parameters of the bi-directional spatial-temporal transformer neural network until a mean-squared error, between the prediction of coordinates for the skeletal joint and the original coordinates of the skeletal joint, converges. In one or more embodiments, the method 1800 also may include, at 1900, training the BDSTT to predict a correct time order; at 2000, training the BDSTT to predict a correct spatial arrangement; and/or, at 2100, training the BDSTT to predict a correct semantic coding.

Figure 19:
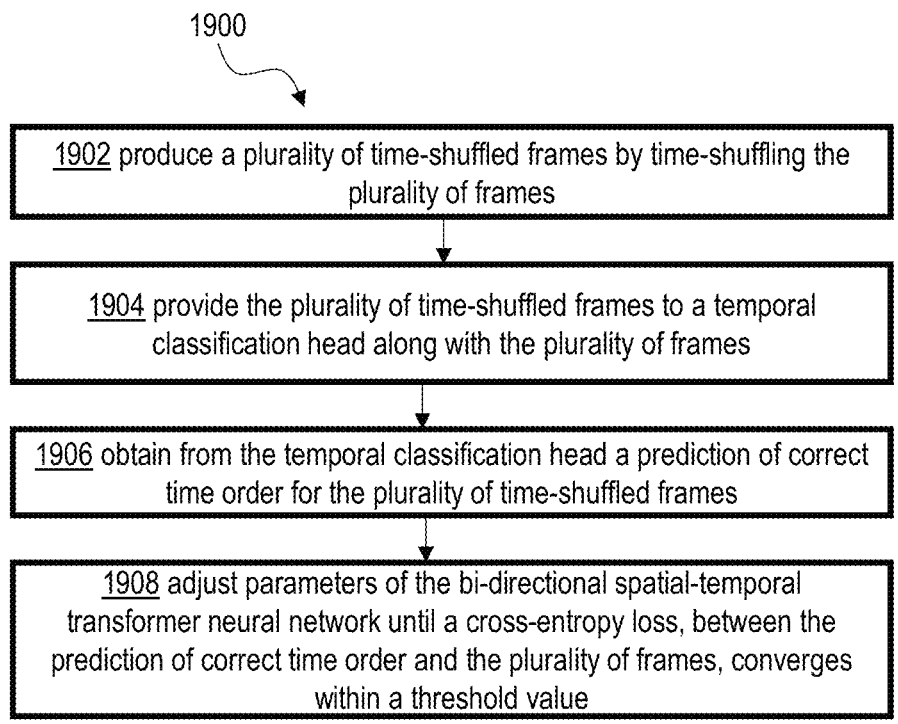
FIG. 19 depicts further steps of training a skeleton-based action recognition system.

Referring specifically to FIG. 19, training the BDSTT to predict a correct time order includes several steps in the illustrated example. At 1902, produce a plurality of time-shuffled frames by time-shuffling the plurality of frames. At 1904 provide the plurality of time-shuffled frames to a temporal classification head along with the plurality of frames. At 1906 obtain from the temporal classification head a prediction of correct time order for the plurality of time-shuffled frames. At 1908 adjust parameters of the bi-directional spatial-temporal transformer neural network until a cross-entropy loss, between the prediction of correct time order and the plurality of frames, converges within a threshold value.

Figure 20:
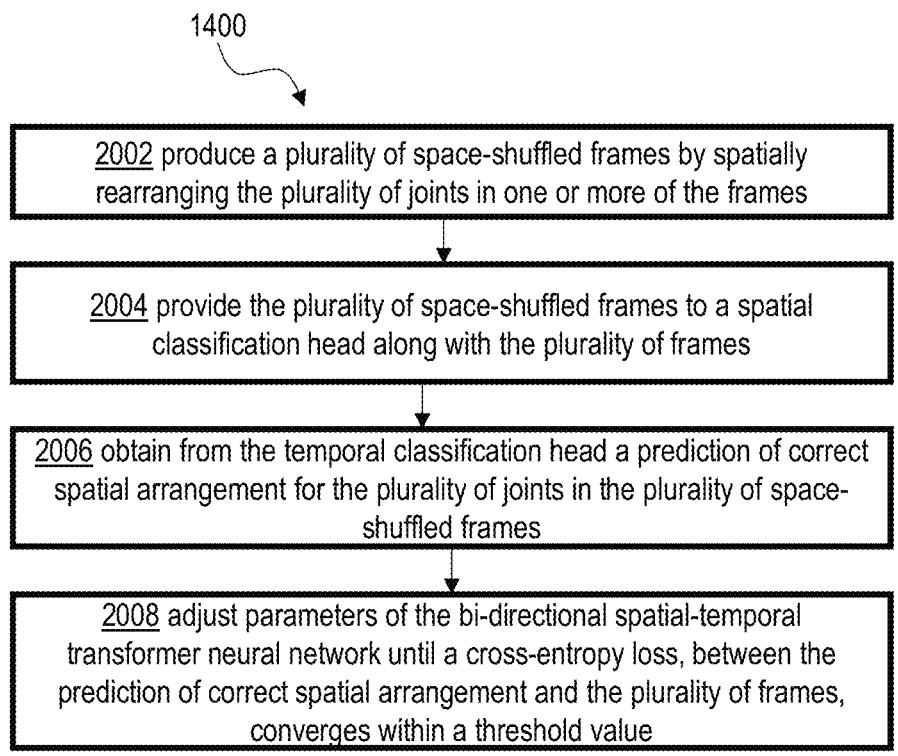
FIG. 20 depicts further steps of training a skeleton-based action recognition system.

Referring specifically to FIG. 20, training the BDSTT to predict a correct spatial arrangement includes several steps in the illustrated example. At 2002 produce a plurality of space-shuffled frames by spatially rearranging the plurality of joints in one or more of the frames. At 2004 provide the plurality of space-shuffled frames to a spatial classification head along with the plurality of frames. At 2006 obtain from the temporal classification head a prediction of correct spatial arrangement for the plurality of joints in the plurality of space-shuffled frames. At 2008 adjust parameters of the bi-directional spatial-temporal transformer neural network until a cross-entropy loss, between the prediction of correct spatial arrangement and the plurality of frames, converges within a threshold value.

Figure 21:
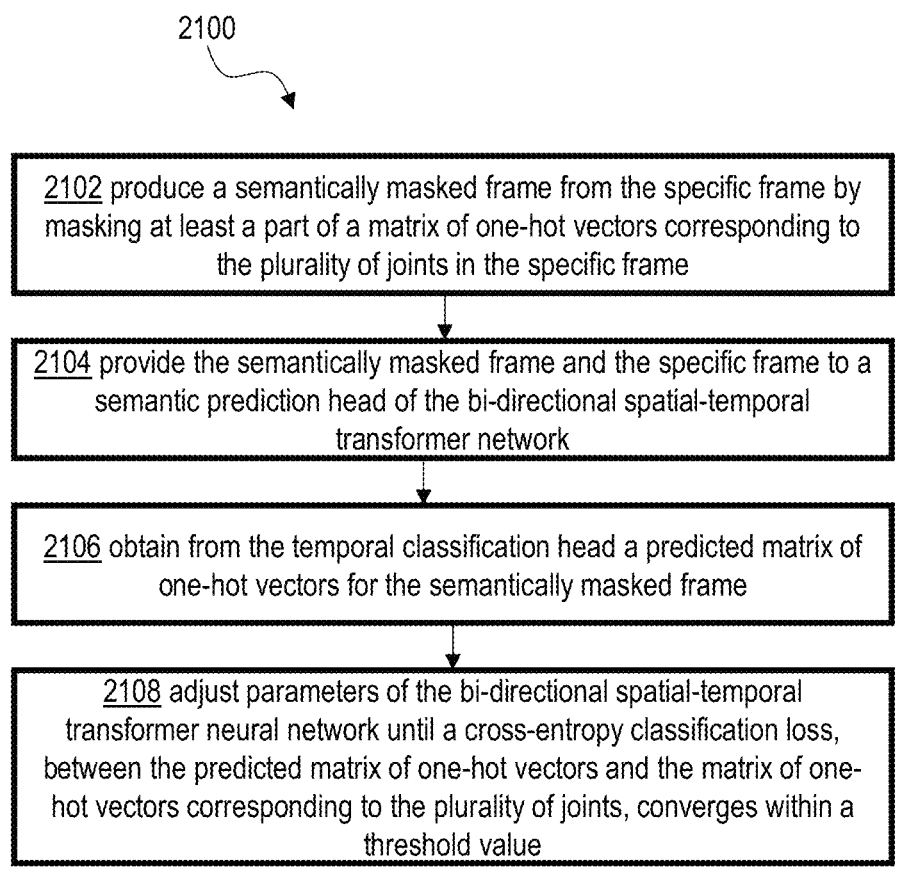
FIG. 21 depicts further steps of training a skeleton-based action recognition system.

Referring now to FIG. 21, training the BDSTT to predict a correct semantic coding includes several steps in the illustrated example. At 2102 produce a semantically masked frame from the specific frame by masking at least a part of a matrix of one-hot vectors corresponding to the plurality of joints in the specific frame. At 2104 provide the semantically masked frame and the specific frame to a semantic prediction head of the bi-directional spatial-temporal transformer network. At 2106 obtain from the temporal classification head a predicted matrix of one-hot vectors for the semantically masked frame. At 2108 adjust parameters of the bi-directional spatial-temporal transformer neural network until a cross-entropy classification loss, between the predicted matrix of one-hot vectors and the matrix of one-hot vectors corresponding to the plurality of joints, converges within a threshold value.

Further, referring again to FIG. 18, it will be appreciated that, in one or more embodiments, aspects of the invention may include controlling a device in response to skeletal motion. For example, at 1816 detect a skeletal joint motion sequence by applying the trained bi-directional spatial-temporal transformer neural network to a sequence of frames. Then at 1818 transmit a control signal to at least one of an electromechanical device, an electrooptical device, and an electronic device, in response to the detected skeletal joint motion sequence (e.g., over I/O interfaces 22 and/or network adapter 20 discussed below).

One or more embodiments of the invention, or elements thereof, can be implemented in the form of an apparatus including a memory and at least one processor that is coupled to the memory and operative to perform exemplary method steps, or in the form of a non-transitory computer readable medium embodying computer executable instructions which when executed by a computer cause the computer to perform exemplary method steps. FIG. 22 depicts a computer system that may be useful in implementing one or more aspects and/or elements of the invention, also representative of a cloud computing node according to an embodiment of the present invention. Referring now to FIG. 22, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 22, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general-purpose computer or workstation. With reference to FIG. 22, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 22) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   instantiating a bi-directional spatial-temporal transformer neural network; and
   training the bi-directional spatial-temporal transformer neural network to predict original coordinates of a skeletal joint in a specific frame through relative relationships of the skeletal joint to other joints and to the state of the skeletal joint in other frames by:
   obtaining a plurality of frames comprising coordinates of the skeletal joint and coordinates of other joints;
   producing a spatially masked frame from the specific frame by masking the original coordinates of the skeletal joint;
   providing the specific frame, the spatially masked frame, and at least one more of the plurality of frames to a coordinate prediction head of the bi-directional spatial-temporal transformer network;
   obtaining, from the coordinate prediction head, a prediction of coordinates for the skeletal joint in the spatially masked frame; and
   adjusting parameters of the bi-directional spatial-temporal transformer neural network until a mean-squared error, between the prediction of coordinates for the skeletal joint and the original coordinates of the skeletal joint, converges.

2. The method of claim 1, further comprising:
   training the bi-directional spatial-temporal transformer neural network to predict a correct time order of sequential coordinates of the skeletal joint by:
   producing a plurality of time-shuffled frames by time-shuffling the plurality of frames;

providing the plurality of time-shuffled frames to a temporal classification head along with the plurality of frames;
obtaining from the temporal classification head a prediction of correct time order for the plurality of time-shuffled frames; and
adjusting parameters of the bi-directional spatial-temporal transformer neural network until a cross-entropy loss, between the prediction of correct time order and the plurality of frames, converges.

3. The method of claim 2, further comprising:
detecting a skeletal joint motion sequence by applying the trained bi-directional spatial-temporal transformer neural network to a sequence of frames; and
transmitting a control signal to at least one of an electromechanical device, an electrooptical device, and an electronic device, in response to the detected skeletal joint motion sequence.

4. The method of claim 1, further comprising:
training the bi-directional spatial-temporal transformer neural network to predict a correct spatial arrangement of coordinates of a plurality of skeletal joints by:
producing a plurality of space-shuffled frames by spatially rearranging the plurality of joints in one or more of the frames;
providing the plurality of space-shuffled frames to a spatial classification head along with the plurality of frames;
obtaining from the spatial classification head a prediction of correct spatial arrangement for the plurality of joints in the plurality of space-shuffled frames; and
adjusting parameters of the bi-directional spatial-temporal transformer neural network until a cross-entropy loss, between the prediction of correct spatial arrangement and the plurality of frames, converges.

5. The method of claim 4, further comprising:
detecting a skeletal joint motion sequence by applying the trained bi-directional spatial-temporal transformer neural network to a sequence of frames; and
transmitting a control signal to at least one of an electromechanical device, an electrooptical device, and an electronic device, in response to the detected skeletal joint motion sequence.

6. The method of claim 1, further comprising:
training the bi-directional spatial-temporal transformer neural network to predict a correct semantic coding of a plurality of skeletal joints by:
producing a semantically masked frame from the specific frame by masking at least a part of a matrix of one-hot vectors corresponding to the plurality of joints in the specific frame;
providing the semantically masked frame and the specific frame to a semantic prediction head of the bi-directional spatial-temporal transformer network;
obtaining from the semantic prediction head a predicted matrix of one-hot vectors for the semantically masked frame; and
adjusting parameters of the bi-directional spatial-temporal transformer network until a cross-entropy classification loss, between the predicted matrix of one-hot vectors and the matrix of one-hot vectors corresponding to the plurality of joints, converges.

7. The method of claim 6, further comprising:
detecting a skeletal joint motion sequence by applying the trained bi-directional spatial-temporal transformer neural network to a sequence of frames; and
transmitting a control signal to at least one of an electromechanical device, an electrooptical device, and an electronic device, in response to the detected skeletal joint motion sequence.

8. A computer program product comprising one or more non-transitory computer readable storage media that embody computer executable instructions, which when executed by a computer cause the computer to perform a method comprising:
instantiating a bi-directional spatial-temporal transformer neural network; and
training the bi-directional spatial-temporal transformer neural network to predict original coordinates of a skeletal joint in a specific frame through relative relationships of the skeletal joint to other joints and to the state of the skeletal joint in other frames by:
obtaining a plurality of frames comprising coordinates of the skeletal joint and coordinates of other joints;
producing a spatially masked frame from the specific frame by masking the original coordinates of the skeletal joint;
providing the specific frame, the spatially masked frame, and at least one more of the plurality of frames to a coordinate prediction head of the bi-directional spatial-temporal transformer network;
obtaining from the coordinate prediction head a prediction of coordinates for the skeletal joint in the spatially masked frame; and
adjusting parameters of the bi-directional spatial-temporal transformer neural network until a mean-squared error, between the prediction of coordinates for the skeletal joint and the original coordinates of the skeletal joint, converges.

9. The computer program product of claim 8, wherein the method further comprises:
training the bi-directional spatial-temporal transformer neural network to predict a correct time order of sequential coordinates of the skeletal joint by:
producing a plurality of time-shuffled frames by time-shuffling the plurality of frames;
providing the plurality of time-shuffled frames to a temporal classification head along with the plurality of frames;
obtaining from the temporal classification head a prediction of correct time order for the plurality of time-shuffled frames; and
adjusting parameters of the bi-directional spatial-temporal transformer neural network until a cross-entropy loss, between the prediction of correct time order and the plurality of frames, converges.

10. The computer program product of claim 9, wherein the method further comprises:
detecting a skeletal joint motion sequence by applying the trained bi-directional spatial-temporal transformer neural network to a sequence of frames; and
transmitting a control signal to at least one of an electromechanical device, an electrooptical device, and an electronic device, in response to the detected skeletal joint motion sequence.

11. The computer program product of claim 8, wherein the method further comprises:
training the bi-directional spatial-temporal transformer neural network to predict a correct spatial arrangement of coordinates of a plurality of skeletal joints by:
producing a plurality of space-shuffled frames by spatially rearranging the plurality of joints in one or more of the frames;

providing the plurality of space-shuffled frames to a spatial classification head along with the plurality of frames;

obtaining from the spatial classification head a prediction of correct spatial arrangement for the plurality of joints in the plurality of space-shuffled frames; and adjusting parameters of the bi-directional spatial-temporal transformer neural network until a cross-entropy loss, between the prediction of correct spatial arrangement and the plurality of frames, converges.

12. The computer program product of claim 11, wherein the method further comprises:

detecting a skeletal joint motion sequence by applying the trained bi-directional spatial-temporal transformer neural network to a sequence of frames; and transmitting a control signal to at least one of an electromechanical device, an electrooptical device, and an electronic device, in response to the detected skeletal joint motion sequence.

13. The computer program product of claim 8, wherein the method further comprises:

training the bi-directional spatial-temporal transformer neural network to predict a correct semantic coding of a plurality of skeletal joints by:

producing a semantically masked frame from the specific frame by masking at least a part of a matrix of one-hot vectors corresponding to the plurality of joints in the specific frame;

providing the semantically masked frame and the specific frame to a semantic prediction head of the bi-directional spatial-temporal transformer network;

obtaining from the semantic prediction head a predicted matrix of one-hot vectors for the semantically masked frame; and adjusting parameters of the bi-directional spatial-temporal transformer network until a cross-entropy classification loss, between the predicted matrix of one-hot vectors and the matrix of one-hot vectors corresponding to the plurality of joints, converges.

14. The computer program product of claim 13, wherein the method further comprises:

detecting a skeletal joint motion sequence by applying the trained bi-directional spatial-temporal transformer neural network to a sequence of frames; and transmitting a control signal to at least one of an electromechanical device, an electrooptical device, and an electronic device, in response to the detected skeletal joint motion sequence.

15. An apparatus comprising:

a memory embodying computer executable instructions; and at least one processor, coupled to the memory, and operative by the computer executable instructions to perform a method comprising:

instantiating a bi-directional spatial-temporal transformer neural network; and training the bi-directional spatial-temporal transformer neural network to predict original coordinates of a skeletal joint in a specific frame through relative relationships of the skeletal joint to other joints and to the state of the skeletal joint in other frames by:

obtaining a plurality of frames comprising coordinates of the skeletal joint and coordinates of other joints;

producing a spatially masked frame from the specific frame by masking the original coordinates of the skeletal joint;

providing the specific frame, the spatially masked frame, and at least one more of the plurality of frames to a coordinate prediction head of the bi-directional spatial-temporal transformer network;

obtaining from the coordinate prediction head a prediction of coordinates for the skeletal joint in the spatially masked frame; and adjusting parameters of the bi-directional spatial-temporal transformer neural network until a mean-squared error, between the prediction of coordinates for the skeletal joint and the original coordinates of the skeletal joint, converges.

16. The apparatus of claim 15, wherein the method further comprises:

training the bi-directional spatial-temporal transformer neural network to predict a correct time order of sequential coordinates of the skeletal joint by:

producing a plurality of time-shuffled frames by time-shuffling the plurality of frames;

providing the plurality of time-shuffled frames to a temporal classification head along with the plurality of frames;

obtaining from the temporal classification head a prediction of correct time order for the plurality of time-shuffled frames; and adjusting parameters of the bi-directional spatial-temporal transformer neural network until a cross-entropy loss, between the prediction of correct time order and the plurality of frames, converges.

17. The apparatus of claim 16, wherein the method further comprises:

detecting a skeletal joint motion sequence by applying the trained bi-directional spatial-temporal transformer neural network to a sequence of frames; and transmitting a control signal to at least one of an electromechanical device, an electrooptical device, and an electronic device, in response to the detected skeletal joint motion sequence.

18. The apparatus of claim 15, wherein the method further comprises:

training the bi-directional spatial-temporal transformer neural network to predict a correct spatial arrangement of coordinates of a plurality of skeletal joints by:

producing a plurality of space-shuffled frames by spatially rearranging the plurality of joints in one or more of the frames;

providing the plurality of space-shuffled frames to a spatial classification head along with the plurality of frames;

obtaining from the spatial classification head a prediction of correct spatial arrangement for the plurality of joints in the plurality of space-shuffled frames; and adjusting parameters of the bi-directional spatial-temporal transformer neural network until a cross-entropy loss, between the prediction of correct spatial arrangement and the plurality of frames, converges.

19. The apparatus of claim 18, wherein the method further comprises:

detecting a skeletal joint motion sequence by applying the trained bi-directional spatial-temporal transformer neural network to a sequence of frames; and transmitting a control signal to at least one of an electromechanical device, an electrooptical device, and an electronic device, in response to the detected skeletal joint motion sequence.

20. The apparatus of claim 15, wherein the method further comprises:
- training the bi-directional spatial-temporal transformer neural network to predict a correct semantic coding of a plurality of skeletal joints by:
  - producing a semantically masked frame from the specific frame by masking at least a part of a matrix of one-hot vectors corresponding to the plurality of joints in the specific frame;
  - providing the semantically masked frame and the specific frame to a semantic prediction head of the bi-directional spatial-temporal transformer network;
  - obtaining from the semantic prediction head a predicted matrix of one-hot vectors for the semantically masked frame; and
  - adjusting parameters of the bi-directional spatial-temporal transformer network until a cross-entropy classification loss, between the predicted matrix of one-hot vectors and the matrix of one-hot vectors corresponding to the plurality of joints, converges.

21. The apparatus of claim 20, wherein the method further comprises:
- detecting a skeletal joint motion sequence by applying the trained bi-directional spatial-temporal transformer neural network to a sequence of frames; and
- transmitting a control signal to at least one of an electromechanical device, an electrooptical device, and an electronic device, in response to the detected skeletal joint motion sequence.

* * * * *